Patented May 26, 1925.

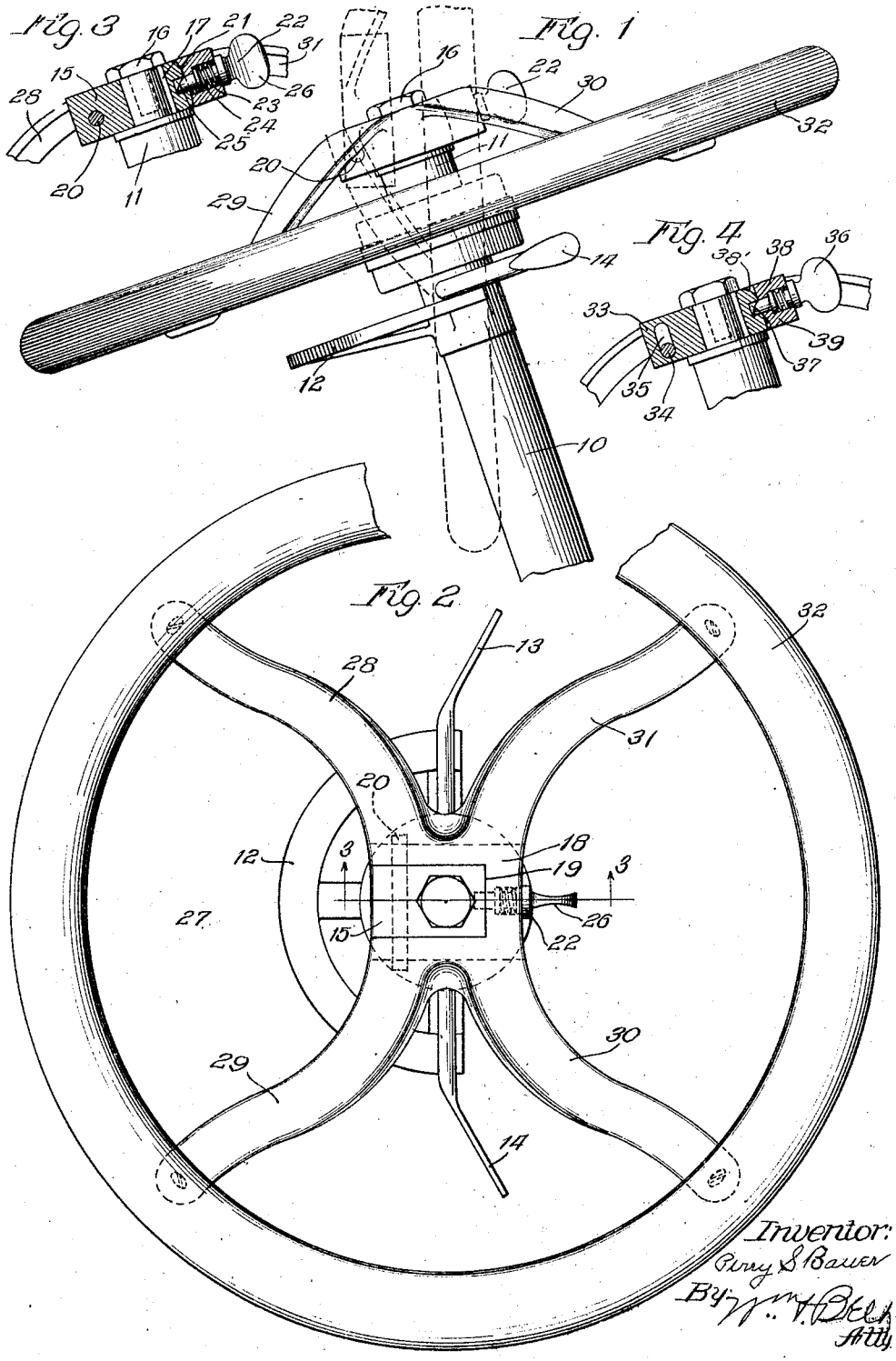

1,538,919

UNITED STATES PATENT OFFICE.

PERRY S. BAUER, OF CHICAGO, ILLINOIS.

TILTING STEERING WHEEL.

Application filed September 22, 1921. Serial No. 502,337.

*To all whom it may concern:*

Be it known that I, PERRY S. BAUER, a citizen of the United States, residing at Chicago, in the county of Cook and State of Illinois, have invented certain new and useful Improvements in Tilting Steering Wheels, of which the following is a specification.

This invention relates to tilting steering wheels and has for its principal object to simplify and improve the construction and to reduce the cost of manufacture of articles of this class.

Another object is to provide a tilting steering wheel which may be applied to cars having the spark and fuel control levers below the wheel as well as those having the control levers above the wheel.

Another object is to provide a construction in which the principal parts can be made by die casting so that practically all expensive machine work may be eliminated.

Other objects will become apparent as the specification is read in connection with the accompanying drawing showing a selected embodiment of the invention and in which—

Fig. 1 is a side elevation of a structure made according to my invention and indicating the tilted position of the steering wheel in dotted lines;

Fig. 2 is a plan view of the steering wheel and the control segment, the left side of the figure being the bottom of the wheel;

Fig. 3 is a sectional detail illustrating the connection between the wheel and the steering shaft and Fig. 4 is a similar sectional detail illustrating a modified structure.

Referring to the drawing and the reference numerals thereon, 10 indicates a steering post having a steering shaft 11 mounted therein and equipped with a control segment 12 and control levers 13 and 14. 15 indicates a hinge element secured to the steering shaft by the nut 16 and a key 17 and here illustrated as a substantially rectangular block or head secured to the steering shaft adjacent to one end. The hub of the steering wheel 18 is preferably provided with a bifurcation 19 corresponding in shape to the shape of the head 15 so that the hub may be secured to the head by a hinge pin 20 passing through the head and the sides of the bifurcation and be free to move from the solid line position in Fig. 1 to the dotted line position in Fig. 2 when desired, and when in the solid line position will be rigidly connected to the steering shaft. I also prefer to curve the upper end 21 of the head 15 on the arc of a circle having a center in the axis of the hinge pin 20 and to make the mating surface of the wheel hub correspond.

In order to secure the wheel in operative position I provide a locking bolt 22 mounted in a socket 23 and yieldingly pressed by the spring 24 towards a socket 25 in the upper end of the head 15. The bolt is provided with a suitable head or handle 26 by which it may be readily withdrawn from the socket 25 when it is desired to tilt the wheel.

In certain automobiles the control levers, the control segment or other mechanism are located just below the steering wheel and have made it impossible to use any form of tilting steering wheel that I am familiar with. In order to take care of this difficulty I have designed a spoke or web structure for the wheel, illustrated in the drawing, in which there is a flaring opening 27 adapted to receive any mechanism that may be on the steering post and allow the wheel as a whole to tilt to substantially the dotted line position shown in Fig. 1 or the corresponding position with the rim on the front side of the steering post in case it is desired to make the wheel tilt upwardly instead of downwardly. As illustrated in the drawing this web structure consists of a spider comprising a hub 18 and four spokes 28, 29, 30 and 31 extending outwardly from the sides of the bifurcation in the hub. The spokes 28 and 29 are substantially tangent to the hub at their point of connection therewith and are curved reversely as indicated to provide the open space 27 and give the web of the wheel the graceful and artistic appearance more or less perfectly illustrated in the drawing. The spokes 30 and 31 are similarly but reversely arranged so that the wheel structure has a symmetrical appearance. The outer ends of these four spokes are connected to the rim 32 which may be of any suitable form or structure.

In some machines it will be found desirable to give the wheel an initial movemens lengthwise of the steering shaft preparatory to tilting. I provide for this movement by the construction illustrated in Fig. 4 wherein the head 33 corresponds to the head 15 and the pivot pin 34 to the pivot pin 20 in Fig. 3. By making the opening in the head 33 for the pin 34 an oblong slot 35, as shown, the wheel as an entirety may be moved lengthwise the shaft when the bolt 36 is withdrawn from the socket 37. In this form I prefer to make the upper end 38 of the head 33 substantially square with the sides and rounded only slightly at the corner 38' to permit the wheel to swing about the pivot 34 when it is in the extreme upper end of the slot 35. The mating surface of the wheel hub 39 should, of course, be made to correspond with the upper end of the head 33.

In the structures illustrated the pivotal connection is located so as to permit the wheel to tilt downwardly, but those skilled in the art will readily understand that slight changes will make it possible for the wheel to tilt upwardly, if desired or found most suitable to the particular car, also when a car is equipped with control levers above the wheel the pivot can be arranged on the front side of the steering post so as to allow the wheel to swing downwardly without meeting with any obstruction.

I wish it also understood that the shape and form of the head 15 is merely illustrative, as a great variety of connections could be used that would permit the desired swinging movement of the wheel.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claim.

I claim:

The combination of a steering shaft, a radial head fixed on the shaft and projecting at opposite sides thereof, a spoked steering wheel having a hub provided with a radial bifurcation of substantially the shape and size of the head and snugly receiving the same, a pivot member extending through the head and the sides of the bifurcated portion of the hub and located between the steering shaft and the open end of the bifurcation, the head being provided with an upright slot receiving the pivot member and permitting vertical bodily movement of the steering wheel preparatory to tilting thereof on the pivot member, the adjacent end walls of the bifurcation and head being shaped to permit tilting of the steering wheel on the pivot member, and a locking member extending through the hub opposite the open end of the bifurcation and into locking engagement with the head.

PERRY S. BAUER.